US006725296B2

(12) United States Patent
Craddock et al.

(10) Patent No.: US 6,725,296 B2
(45) Date of Patent: Apr. 20, 2004

(54) APPARATUS AND METHOD FOR MANAGING WORK AND COMPLETION QUEUES USING HEAD AND TAIL POINTERS

(75) Inventors: David F. Craddock, New Paltz, NY (US); Thomas Anthony Gregg, Highland, NY (US); Ian David Judd, Winchester (GB); Gregory Francis Pfister, Austin, TX (US); Renato John Recio, Austin, TX (US); Donald William Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 09/915,663

(22) Filed: Jul. 26, 2001

(65) Prior Publication Data

US 2003/0023786 A1 Jan. 30, 2003

(51) Int. Cl.[7] .................................................. G06F 3/00
(52) U.S. Cl. ............................ 710/52; 710/57; 710/112
(58) Field of Search ............................ 710/52, 57, 112, 710/39, 5, 24; 711/154

(56) References Cited

U.S. PATENT DOCUMENTS

| 6,012,107 A | * | 1/2000 | Young ........................... 710/39 |
| 6,125,114 A | * | 9/2000 | Blanc et al. ................. 370/389 |
| 6,128,715 A | * | 10/2000 | Wang et al. ................. 711/168 |
| 6,145,061 A | * | 11/2000 | Garcia et al. ................ 711/154 |
| 6,157,964 A | * | 12/2000 | Young ............................. 710/5 |
| 6,205,118 B1 | * | 3/2001 | Rathnavelu ................. 370/229 |
| 6,286,076 B1 | * | 9/2001 | Schultz ........................ 711/101 |
| 6,292,491 B1 | * | 9/2001 | Sharper ....................... 370/412 |
| 6,324,164 B1 | * | 11/2001 | Luijten et al. .............. 370/230 |
| 6,426,957 B1 | * | 7/2002 | Hauser et al. .............. 370/413 |
| 6,609,161 B1 | * | 8/2003 | Young ............................. 710/5 |

* cited by examiner

Primary Examiner—Jeffrey Gaffin
Assistant Examiner—Harold Kim
(74) Attorney, Agent, or Firm—Duke W. Yee; Casimer K. Salys; Stephen J. Walder, Jr.

(57) ABSTRACT

An apparatus and method for managing work and completion queues using head and tail circular pointers. With the apparatus and method, queue head and tail pointers are maintained in the channel interface and the host channel adapter. The head and tail pointers in the host channel adapter include a queue pointer table index and a queue page index for identifying a position within the queue. For work queues, the tail pointer in the channel interface is used to identify a next position where a work queue entry may be written. The head pointer in the channel interface is used only to determine whether the work queue is full or not. The head pointer in the host channel adapter is used to identify a next work queue entry for processing by the host channel adapter. The tail pointer in the host channel adapter is used by the host channel adapter to determine if the queue is empty. For completion queues, the head pointer in the channel interface is used to identify a next completion queue entry to be processed. The tail pointer in the host channel adapter is used to identify a next position in the completion queue to which the host channel adapter may post a completion queue entry.

30 Claims, 13 Drawing Sheets

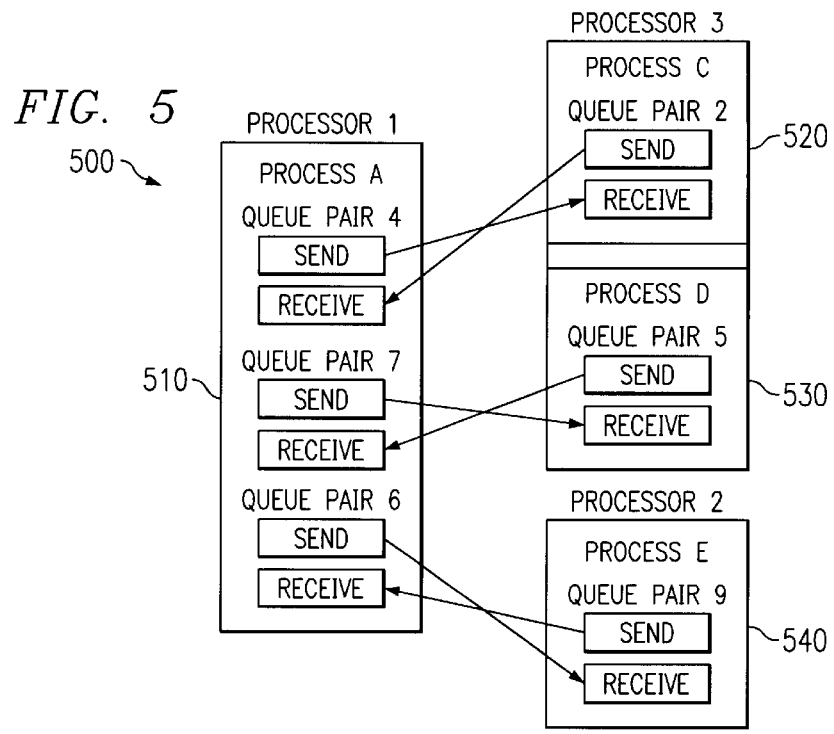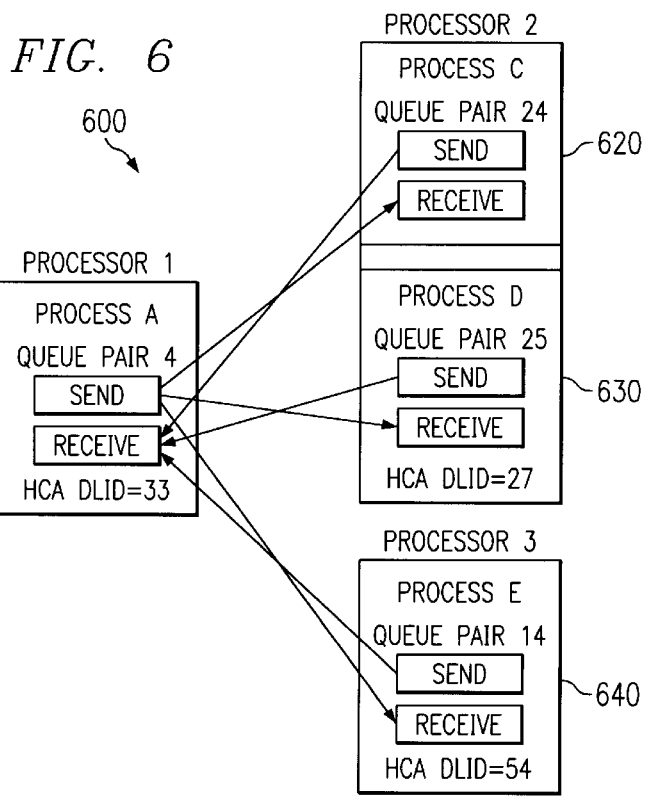

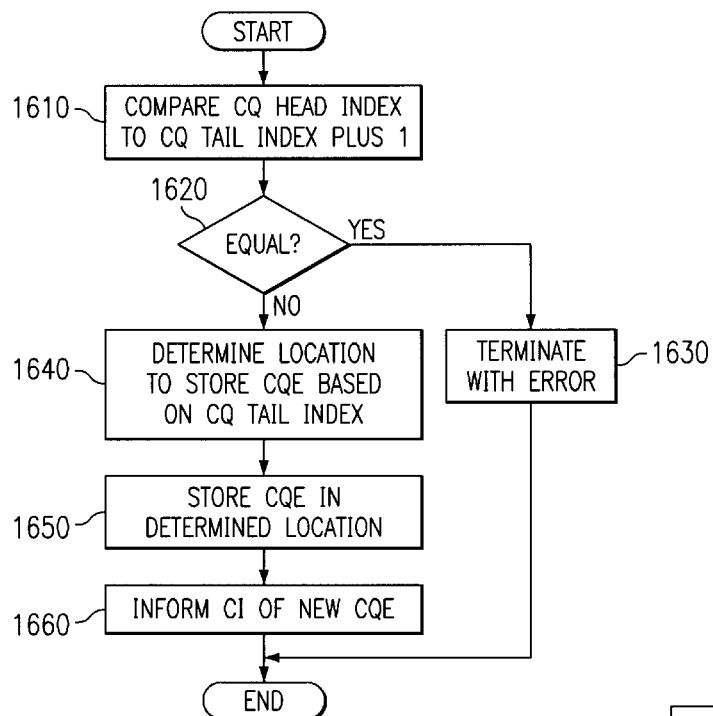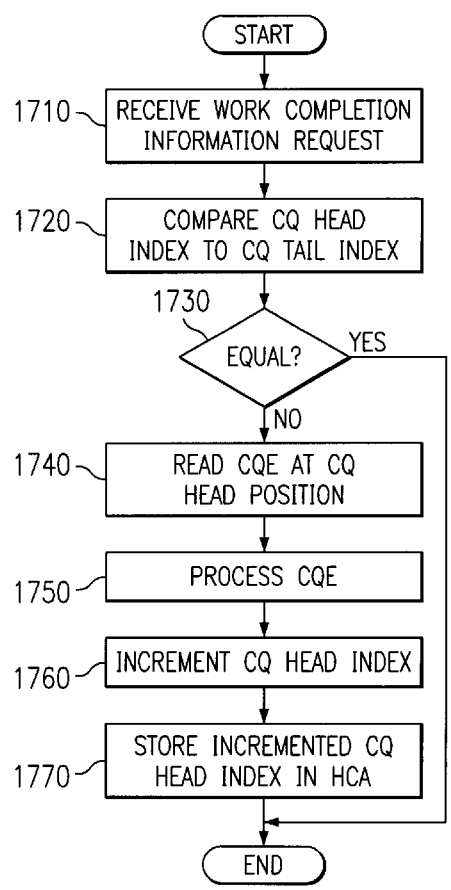

APPARATUS AND METHOD FOR MANAGING WORK AND COMPLETION QUEUES USING HEAD AND TAIL POINTERS

BACKGROUND OF THE INVENTION

1. Technical Field

The present invention is directed to an improved data processing system. More specifically, the present invention is directed to an apparatus and method for managing work and completion queues using head and tail pointers.

2. Description of Related Art

In a System Area Network (SAN), the hardware provides a message passing mechanism that can be used for Input/Output devices (I/O) and interprocess communications (IPC) between general computing nodes. Processes executing on devices access SAN message passing hardware by posting send/receive messages to send/receive work queues on a SAN channel adapter (CA). These processes also are referred to as "consumers."

The send/receive work queues (WQ) are assigned to a consumer as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

The SAN channel adapter architecture explicitly provides for sending and receiving messages directly from application programs running under an operating system. No intervention by the operating system is required for an application program to post messages on send queues, post message receive buffers on receive queues, and detect completion of send or receive operations by polling of completion queues or detecting the event of an entry stored on a completion queue, e.g., via an interrupt.

Traditional Peripheral Component Interconnect (PCI) based adapters use queues that are managed by a microprocessor. Such management by a microprocessor involves a queue management software application being run by the microprocessor to manage the queue(s). The execution of software instructions always results in performance losses when compared to purely hardware based operations. Therefore, it would be beneficial to have an apparatus and method for managing queues entirely in hardware and thereby improve performance of the system. Moreover, it would be beneficial to have such an apparatus and method for managing queues in a channel adapter of a system area network.

SUMMARY OF THE INVENTION

The present invention provides an apparatus and method for managing work and completion queues using head and tail pointers. With the apparatus and method of the present invention, queue head and tail pointers are maintained in the channel interface and the host channel adapter. The head and tail pointers in the host channel adapter include a queue page table index and a queue page index for identifying a position within the queue.

For work queues, the tail pointer in the channel interface is used to identify a next position where a work queue entry may be written. The head pointer in the channel interface is used only to determine whether the work queue is full or not. The head pointer in the host channel adapter is used to identify a next work queue entry for processing by the host channel adapter. The tail pointer in the host channel adapter is used by the host channel adapter to determine if the queue is empty.

For completion queues, the head pointer in the channel interface is used to identify a next completion queue entry to be processed. The tail pointer in the channel interface is used only to determine whether the completion queue is empty or not. The tail pointer in the host channel adapter is used to identify a next position in the completion queue to which the host channel adapter may post a completion queue entry. The head pointer in the host channel adapter is used by the host channel adapter to determine if the queue is full.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a portion of a distributed computer system in accordance with a preferred embodiment of the present invention in which a reliable connection service is used;

FIG. 6 is a diagram illustrating a portion of a distributed computer system in accordance with a preferred embodiment of the present invention in which reliable datagram service connections are used;

FIG. 16 is a flowchart outlining an exemplary operation of the present invention when storing a completion queue entry; and FIG. 17 is a flowchart outlining an exemplary operation of the present invention when processing a completion queue entry.

DETAILED DESCRIPTION OF THE PREFERRED EMBODIMENT

The present invention provides an apparatus and method for managing work and completion queues using head and tail pointers. The present invention may be implemented in hardware, software, or a combination of hardware and software. The present invention is preferably implemented in a distributed computing system, such as a system area network (SAN) having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

Figure 1:
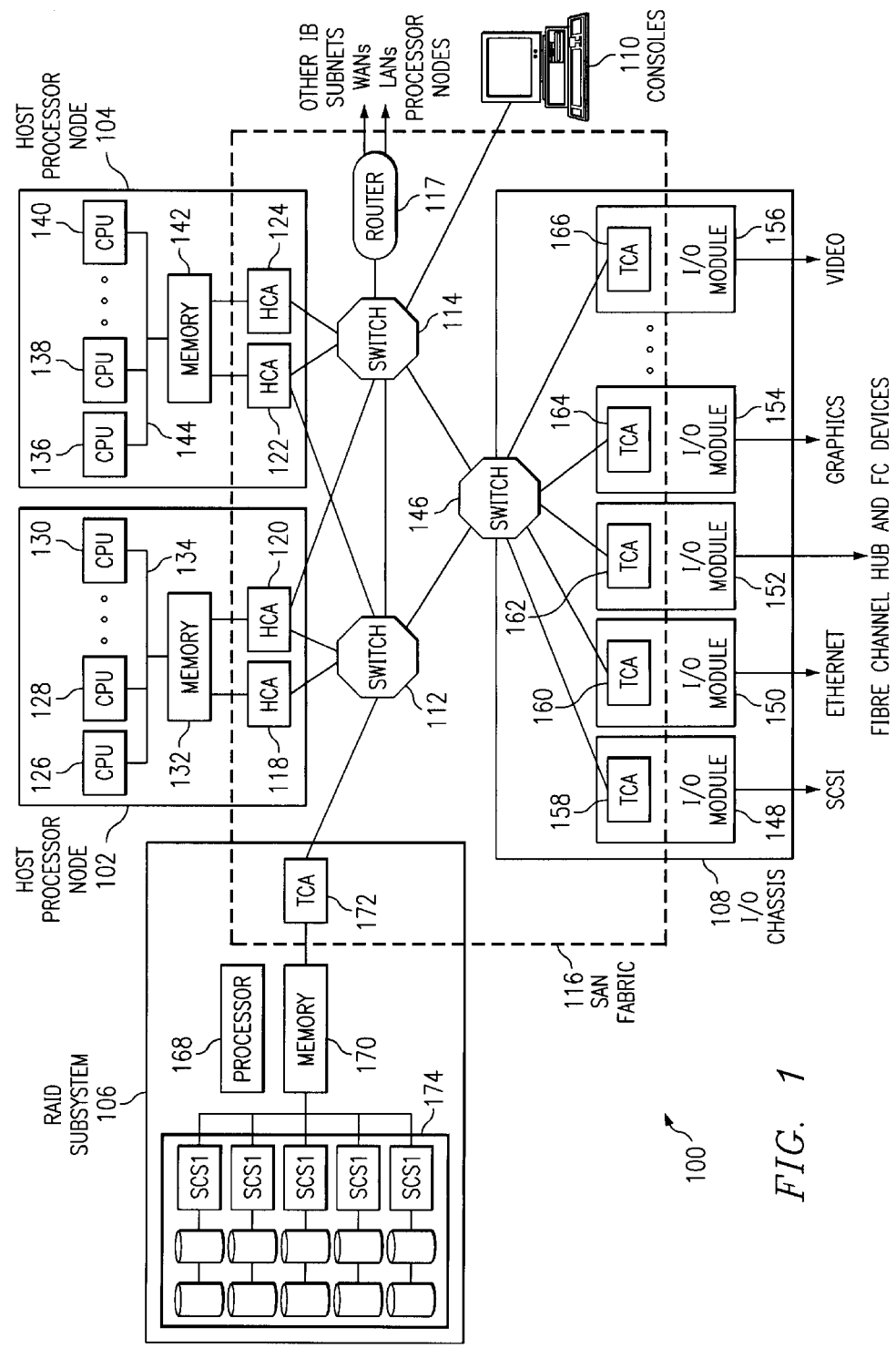
FIG. 1 is a diagram of a distributed computer system is illustrated in accordance with a preferred embodiment of the present invention.

FIG. 1 is a diagram of a distributed computer system in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100.

Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers. The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
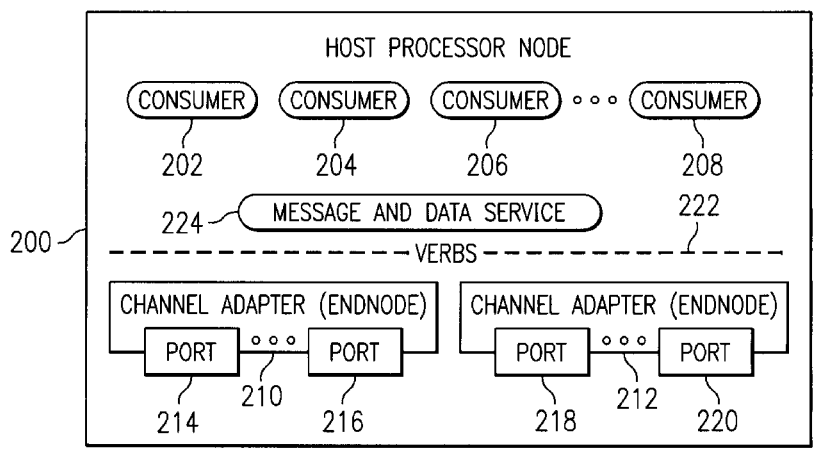
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

Figure 3A:
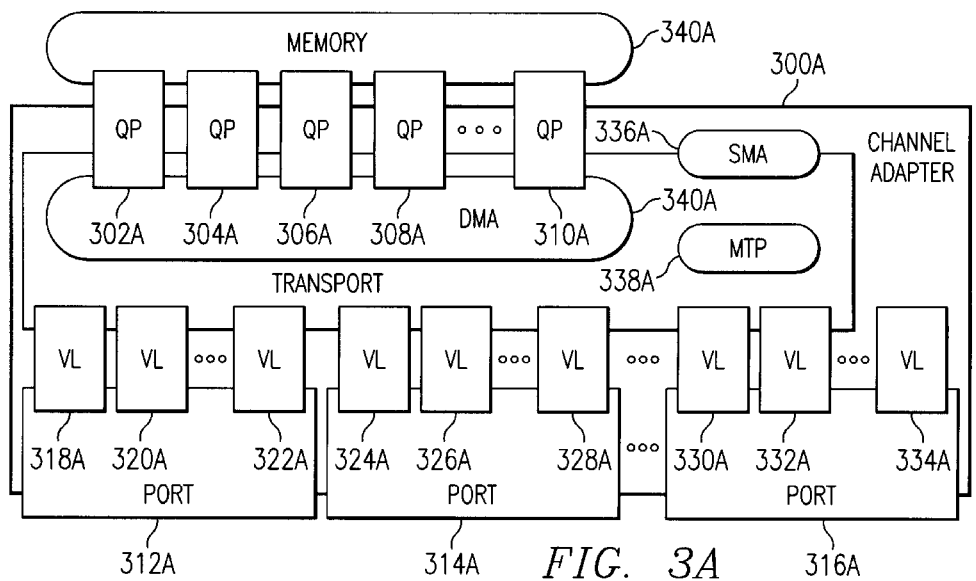
FIG. 3A is a diagram of a host channel adapter in accordance with a preferred embodiment of the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302A–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID. Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A–310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
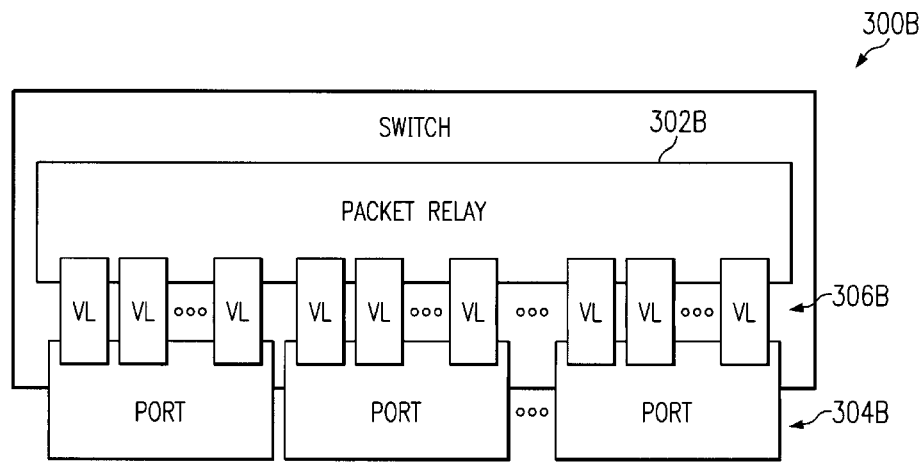
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
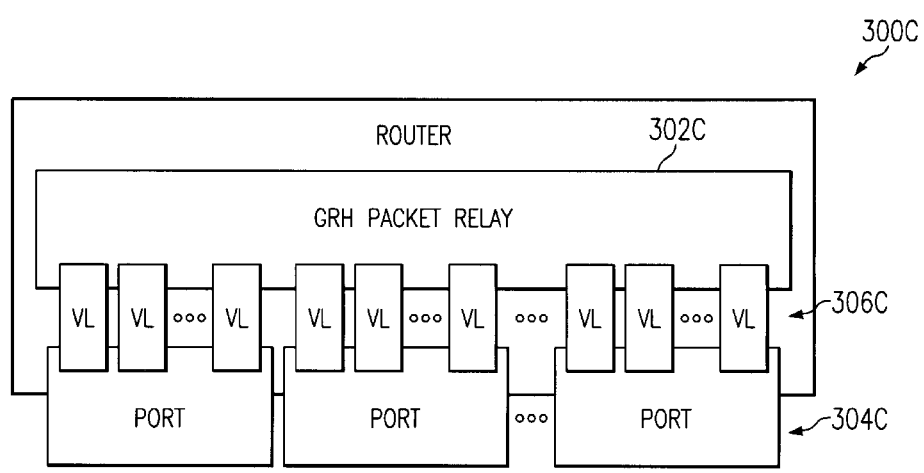
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress. Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
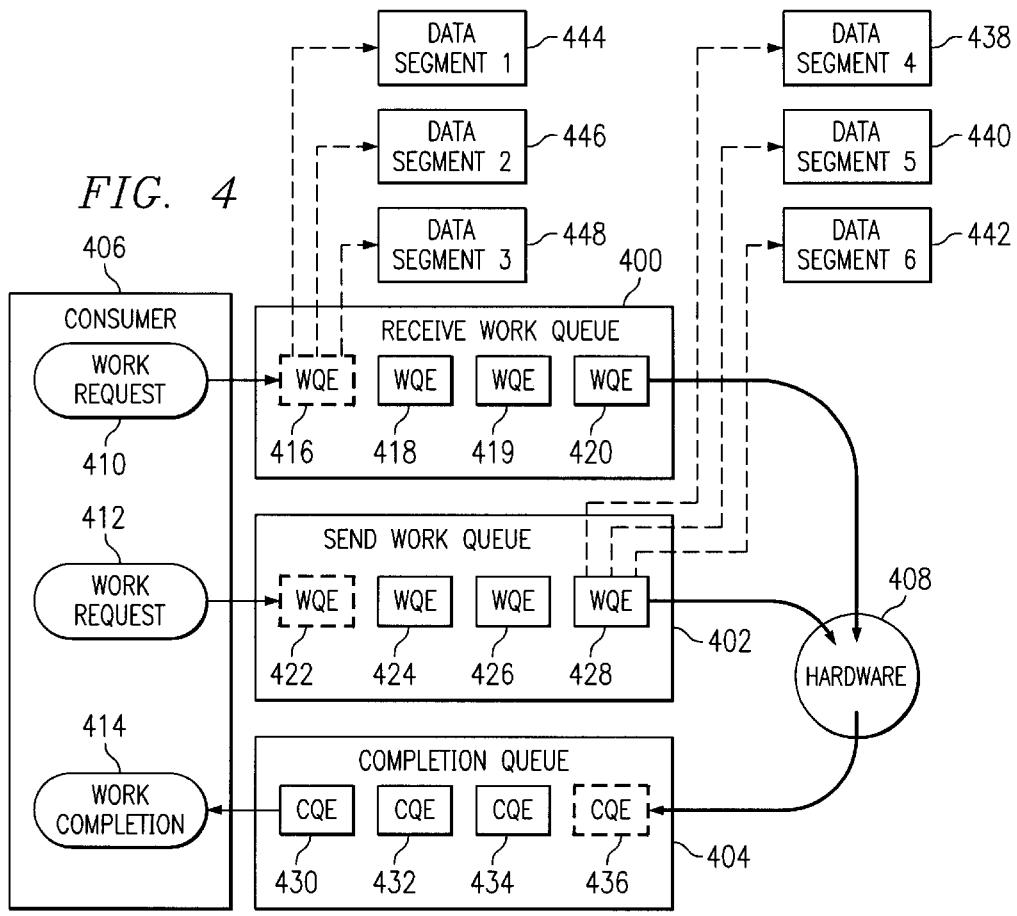
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 7:
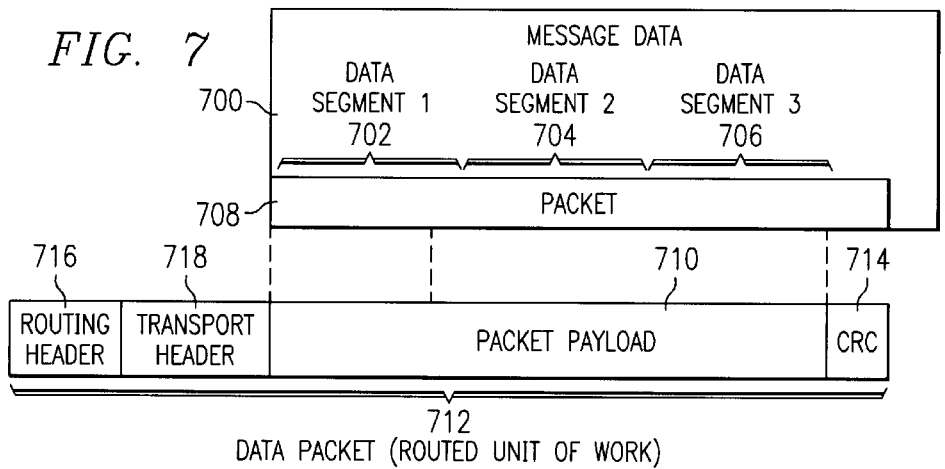
FIG. 7 is an illustration of a data packet in accordance with a preferred embodiment of the present invention.

Turning next to FIG. 7, an illustration of a data packet is depicted in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

Figure 8:
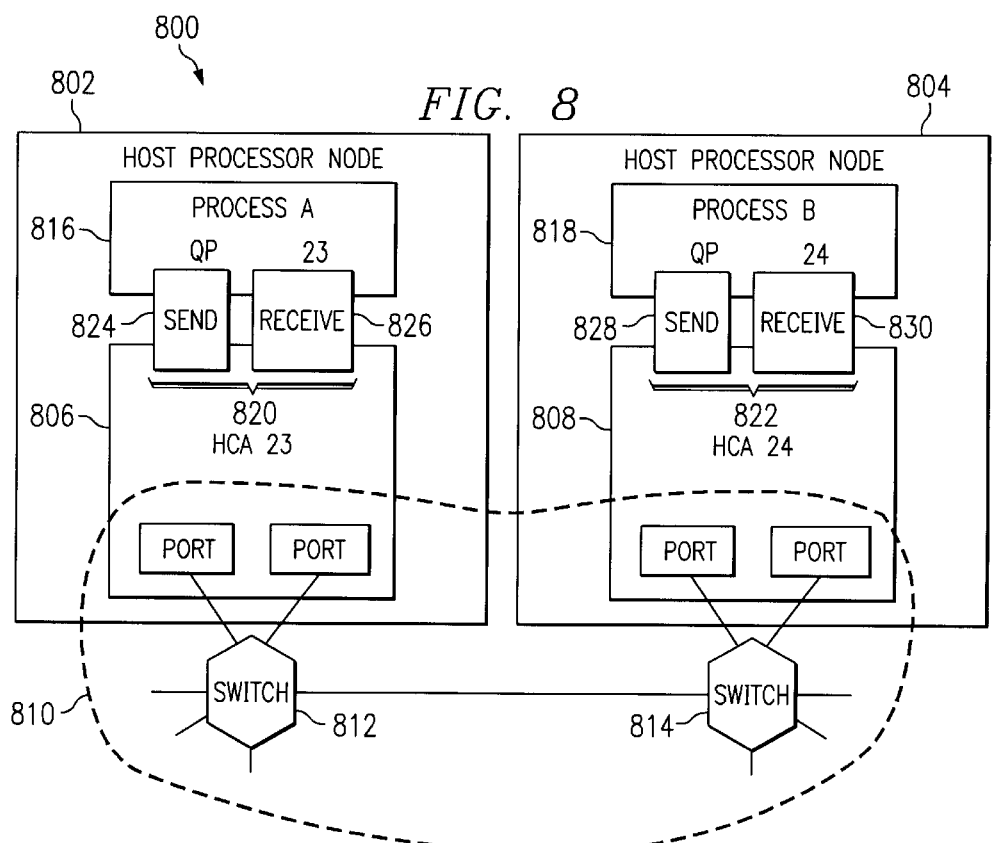
FIG. 8 is a diagram illustrating a portion of a distributed computer system in accordance with a preferred embodiment of the present invention.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue. Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

Figure 9:
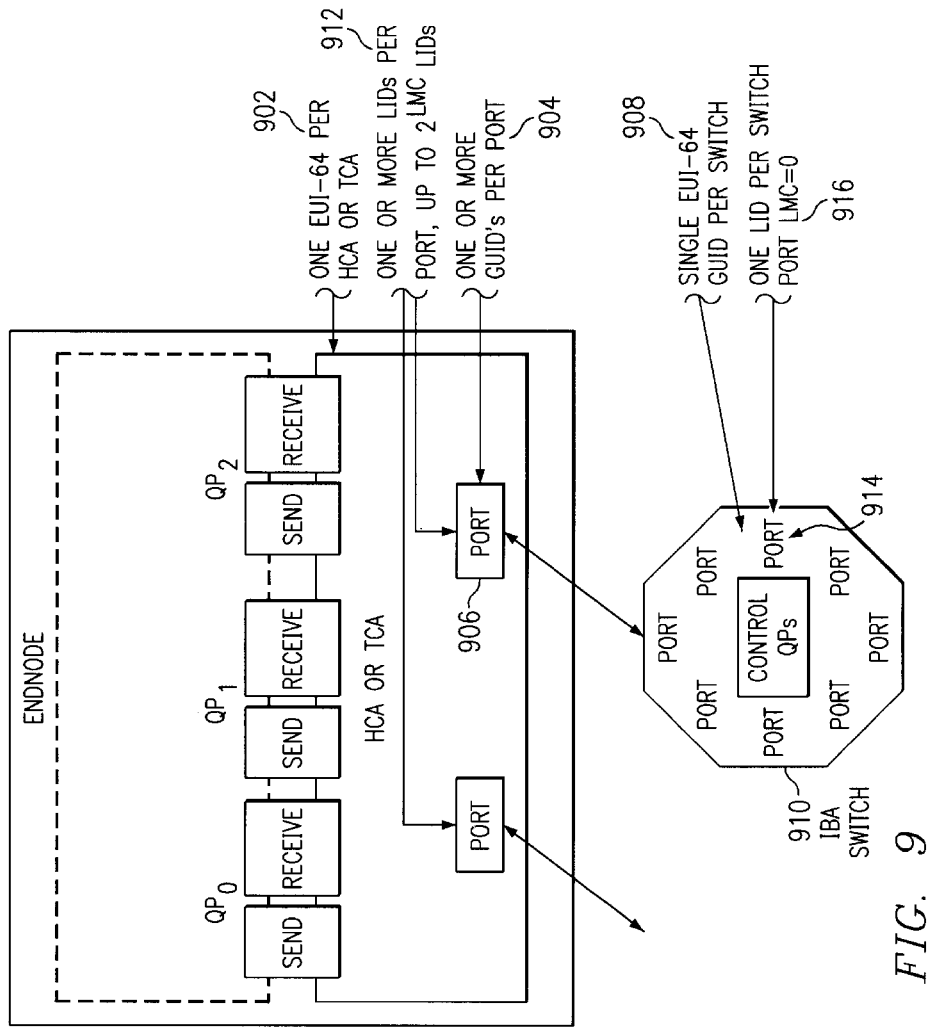
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs. A single IEEE assigned 64-bit identifier (EUI-64) 902 is assigned to each component. A component can be a switch, router, or CA.

One or more globally unique ID (GUID) identifiers 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes.

One GUID 908 is assigned to a switch 910.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 906 has up to $2^{LMC}$ LIDs 912 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. A single switch port 914 has one LID 916 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
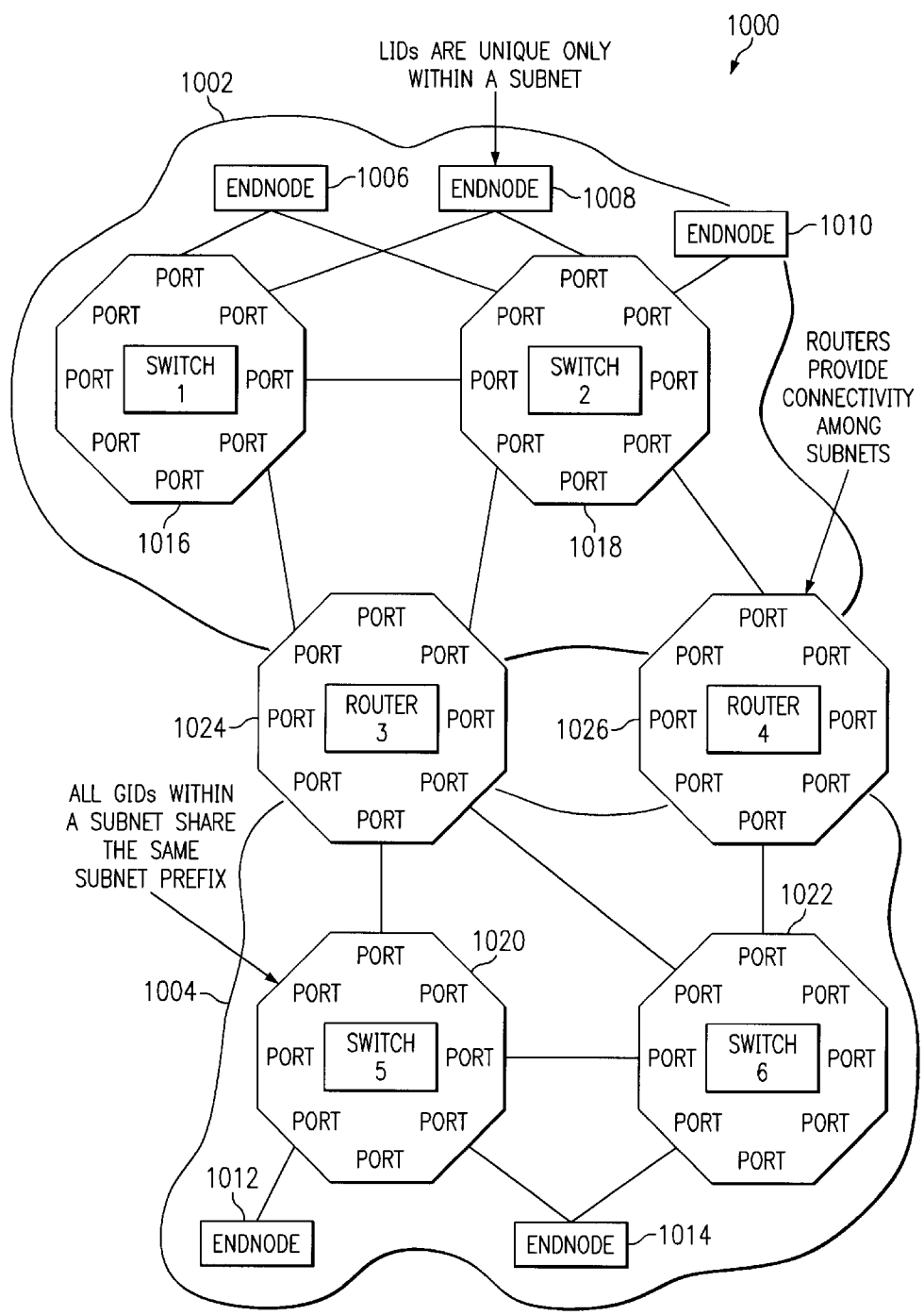
FIG. 10 is a diagram illustrating a portion of a distributed computing system in accordance with a preferred embodiment of the present invention in which the structure of SAN fabric subnets is illustrated.

A portion of a distributed computer system in accordance with a preferred embodiment of the present invention is illustrated in FIG. 10. Distributed computer system 1000 includes a subnet 1002 and a subnet 1004. Subnet 1002 includes host processor nodes 1006, 1008, and 1010. Subnet 1004 includes host processor nodes 1012 and 1014. Subnet 1002 includes switches 1016 and 1018. Subnet 1004 includes switches 1020 and 1022.

Routers connect subnets. For example, subnet 1002 is connected to subnet 1004 with routers 1024 and 1026. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of endnodes formed by cascaded switches.

As illustrated in FIG. 10, for expansion to much larger systems, subnets are connected with routers, such as routers 1024 and 1026. The router interprets the IP destination ID (e.g., IPv6 destination ID) and routes the IP-like packet.

An example embodiment of a switch is illustrated generally in FIG. 3B. Each I/O path on a switch or router has a port. Generally, a switch can route packets from one port to any other port on the same switch.

Within a subnet, such as subnet 1002 or subnet 1004, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing certain routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3A, 5, and 6. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 11:
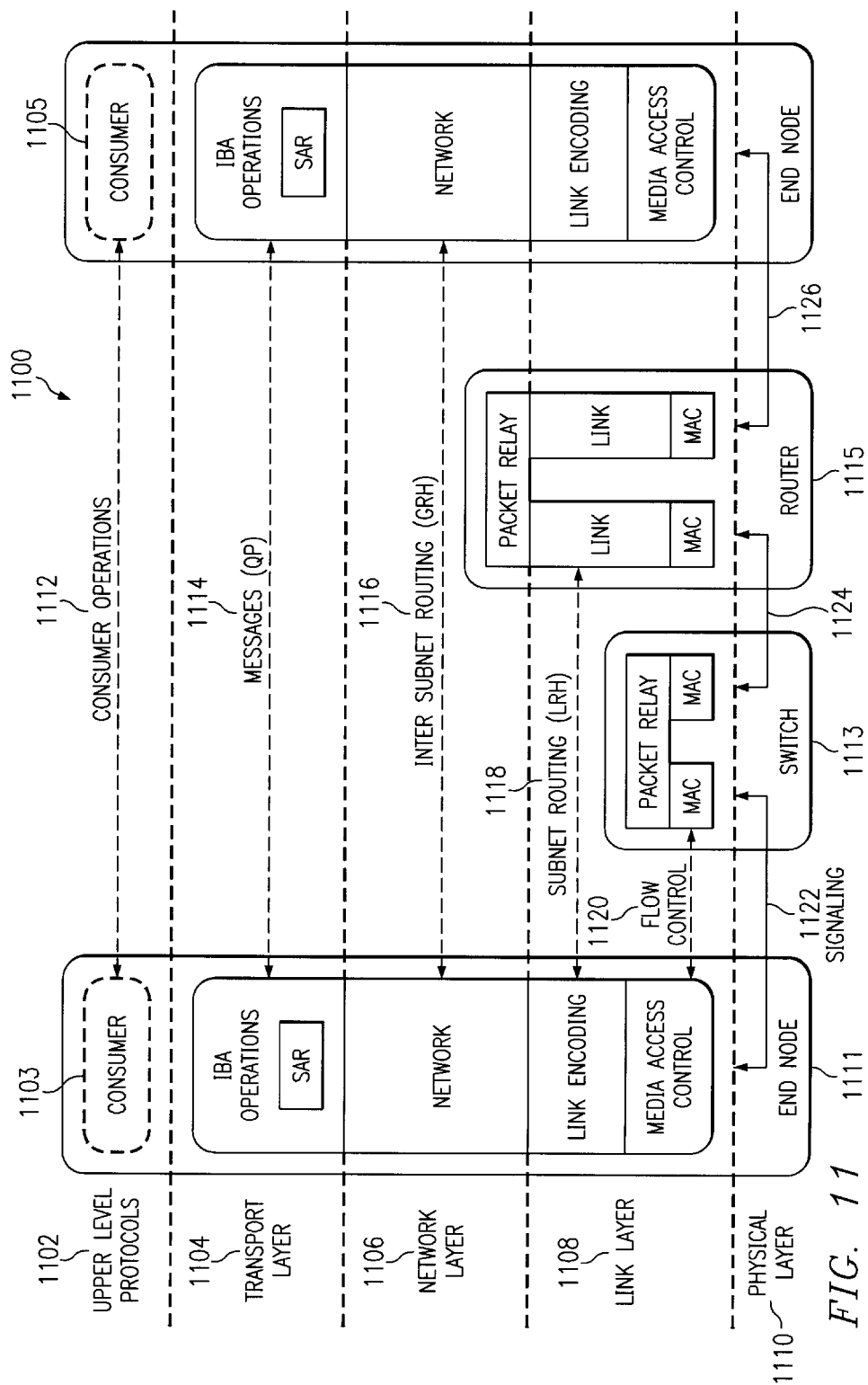
FIG. 11 is a diagram of a layered communication architecture used in a preferred embodiment of the present invention.

One embodiment of a layered architecture 1100 for implementing the present invention is generally illustrated in diagram form in FIG. 11. The layered architecture diagram of FIG. 11 shows the various layers of data communication paths, and organization of data and control information passed between layers.

Host channel adapter endnode protocol layers (employed by endnode 1111, for instance) include an upper level protocol 1102 defined by consumer 1103, a transport layer 1104; a network layer 1106, a link layer 1108, and a physical layer 1110. Switch layers (employed by switch 1113, for instance) include link layer 1108 and physical layer 1110. Router layers (employed by router 1115, for instance) include network layer 1106, link layer 1108, and physical layer 1110.

Layered architecture 1100 generally follows an outline of a classical communication stack. With respect to the protocol layers of end node 1111, for example, upper layer protocol 1102 employs verbs (1112) to create messages at transport layer 1104. Transport layer 1104 passes messages (1114) to network layer 1106. Network layer 1106 routes packets between network subnets (1116). Link layer 1108 routes packets within a network subnet (1118). Physical layer 1110 sends bits or groups of bits to the physical layers of other devices. Each of the layers is unaware of how the upper or lower layers perform their functionality.

Consumers 1103 and 1105 represent applications or processes that employ the other layers for communicating between endnodes. Transport layer 1104 provides end-to-end message movement. In one embodiment, the transport layer provides four types of transport services as described above which are reliable connection service; reliable datagram service; unreliable datagram service; and raw datagram service. Network layer 1106 performs packet routing through a subnet or multiple subnets to destination endnodes. Link layer 1108 performs flow-controlled, error checked, and prioritized packet delivery across links.

Physical layer 1110 performs technology-dependent bit transmission. Bits or groups of bits are passed between physical layers via links 1122, 1124, and 1126. Links can be implemented with printed circuit copper traces, copper cable, optical cable, or with other suitable links.

The present invention operates within the SAN environment described above with regard to FIGS. 1–11. The present invention provides a mechanism for managing work and completion queues in the SAN architecture using head and tail pointers. The description of the present invention will be provided for both the work and the completion queue in order to provide an understanding of how the head and tail pointers are used with each. It should be appreciated that the following descriptions of the operation of the present invention with the work and completion queues are exemplary and modifications may be made without departing from the spirit and scope of the present invention.

Work Queue Structure

Figure 12:
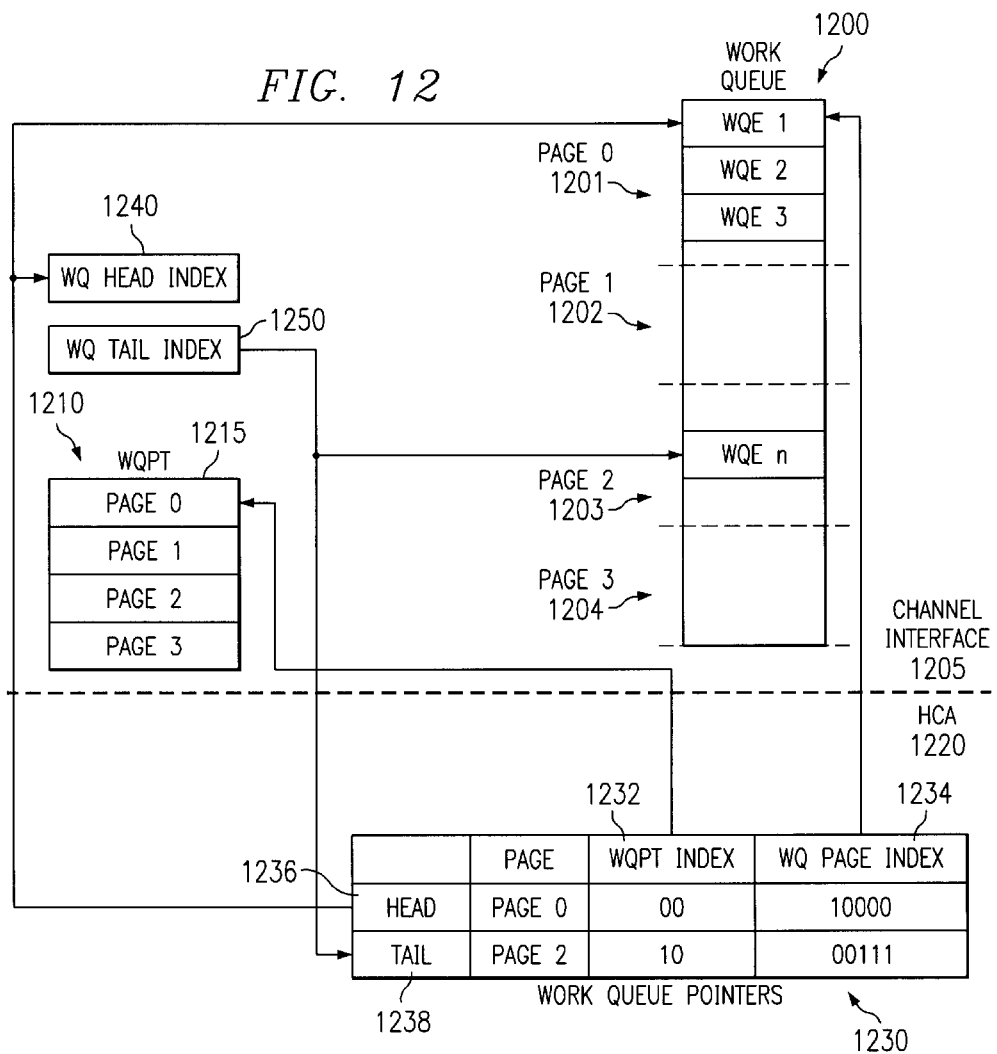
FIG. 12 is an exemplary block diagram of a work queue in accordance with the present invention.

FIG. 12 shows an example work queue in accordance with one embodiment of the present invention. The work queue (WQ) 1200 shown in FIG. 12 may be either a send queue or a receive queue. The work queue 1200 is made up of one or more pages 1201–1204, which are typically 4 Kbytes in size, although other sizes may be used. In the depicted example, the work queue 1200 uses four pages 1201–1204 located in system memory.

The work queue entry (WQE) size, in this exemplary embodiment, is chosen such that the number of WQEs that fit within a page is a power of two. The reason for this is that the hardware, i.e. The channel adapter hardware that manages the queue, is simplified by making this number of WQEs a power of two, while still maintaining significant flexibility in the choice of size of work queue. This is because when the number of WQEs that fit within a page is a power of two, it is easier to detect in the hardware when the end of the page has been reached, e.g., the index wraps from all 1's to all 0's. If the number of WQEs is not a power of two, the hardware needs adders and comparators to determine when the end of the page is reached. Such an embodiment is intended to be within the spirit and scope of the present invention even though such an embodiment is not the preferred embodiment.

For example, with a 64 byte WQE, 64 WQEs would fit in a 4K page. In this exemplary embodiment, such a WQE size provides a queue depth of 256 WQEs. Different queue depths can be provided by changing the number of pages that make up the work queue 1200. Other WQE sizes may be chosen without departing from the spirit and scope of the present invention with less simplified hardware being a result.

A Work Queue Page Table (WQPT) 1210 is maintained in memory, such as system memory or HCA memory, that contains a list 1215 of pages that make up the work queue 1200. Whether the WQPT 1210 is located in system memory or host channel adapter (HCA) memory, in either case the WQPT location is stored in the HCA 1220.

The HCA 1220 stores pointers 1230 to the WQPT 1210 and the pages of the WQ 1200. The HCA 1220 maintains two indices for each work queue 1200. The first, the WQPT index 1232, is used to index into the aforementioned WQPT 1210. In the depicted example, the WQPT index 1232 is two bits, although other sizes for the WQPT index 1232 may be used without departing from the spirit and scope of the present invention.

The second index is the WQ Page Index 1234, which is used to index into each page 1201–1204 of the work queue. For example, with a 64 byte WQE and a 4K page, the WQ Page Index 1234 would be 6 bits (the use of 6 bits gives a range from binary 000000 to binary 111111, which is decimal 0 to decimal 63 which is a total of 64. 64 WQEs of size 64 bytes fit in a 4096 byte page). Other sizes for the WQ Page Index 1234 may be used without departing from the spirit and scope of the present invention.

The WQ 1200 further has associated with it a WQ head index 1240 and a WQ tail index 1250 in the Channel Interface 1205. As will be explained in greater detail hereafter, the WQ head index 1240 is used to determine if the WQ 1200 is full, and the WQ tail index 1250 is used by the present invention to manage the writing of WQEs in the WQ 1200.

The HCA maintains its own version of the WQ head index 1236 and WQ tail index 1238. These WQ indices are comprised of the WQPT Index 1232 and the WQ Page Index 1234 for the WQ head index 1236 and WQ tail index 1238, respectively. As will be described in greater detail hereafter, the HCA 1220 uses the WQ tail index 1238 to identify whether the work queue is empty, and uses the WQ head index 1236 to determine the next WQE to be processed by the HCA 1220.

The initial state of the WQ 1200 is empty whereby the WQ head and tail indexes 1240 and 1250 are equal and reference the top of the WQ 1200. The WQ head index 1236 in the HCA 1220 points to the position within the WQ 1200 of the next WQE to be processed. The WQ tail index 1250 points to the position within the WQ 1200 where the next WQE may be written to the WQ 1200.

As WQEs are written to the WQ 1200, the position of the WQ tail index 1250 moves through the WQ 1200. Similarly, as WQEs are processed, the WQ head index 1236 in the HCA 1220 moves through the WQ 1200. As a result, the WQPT index 1232 and WQ page index 1234 for the WQ head index 1236 changes due to the moving of the WQ head index 1236 through the WQ 1200.

The WQ head index 1236 is periodically used to update the WQ head index 1240 in the channel interface 1205. The updated WQ head index 1240 may then be used by the channel interface 1205 to determine if the WQ 1200 is full and whether WQEs may be written to the WQ 1200.

Similarly, the WQ tail index 1250 is periodically used to update the WQ tail index 1238 and thus, the WQPT index 1232 and WQ page index 1234 for the WQ tail index 1238. The WQ tail index 1238 may then be used by the HCA 1220 to determine if the WQ 1200 is empty or whether there are WQEs that may be processed.

Thus, the HCA 1220 is mainly concerned with the WQPT index 1232 and the WQ page index 1234 of the WQ head index 1236 in determining the next WQE to be processed. The WQ tail index 1238 is only used to determine if the WQ 1200 is empty and thus, there are no WQEs to be processed.

The channel interface 1205, however, is primarily concerned with the WQ tail index 1250 which is used to determine the next position in the WQ 1200 where a WQE may be written. The channel interface 1205 uses the WQ head index 1240 only to determine whether the WQ 1200 is full and thus, WQEs cannot be written to it until a completion queue entry is posted.

Completion Queue Structure

Figure 13:
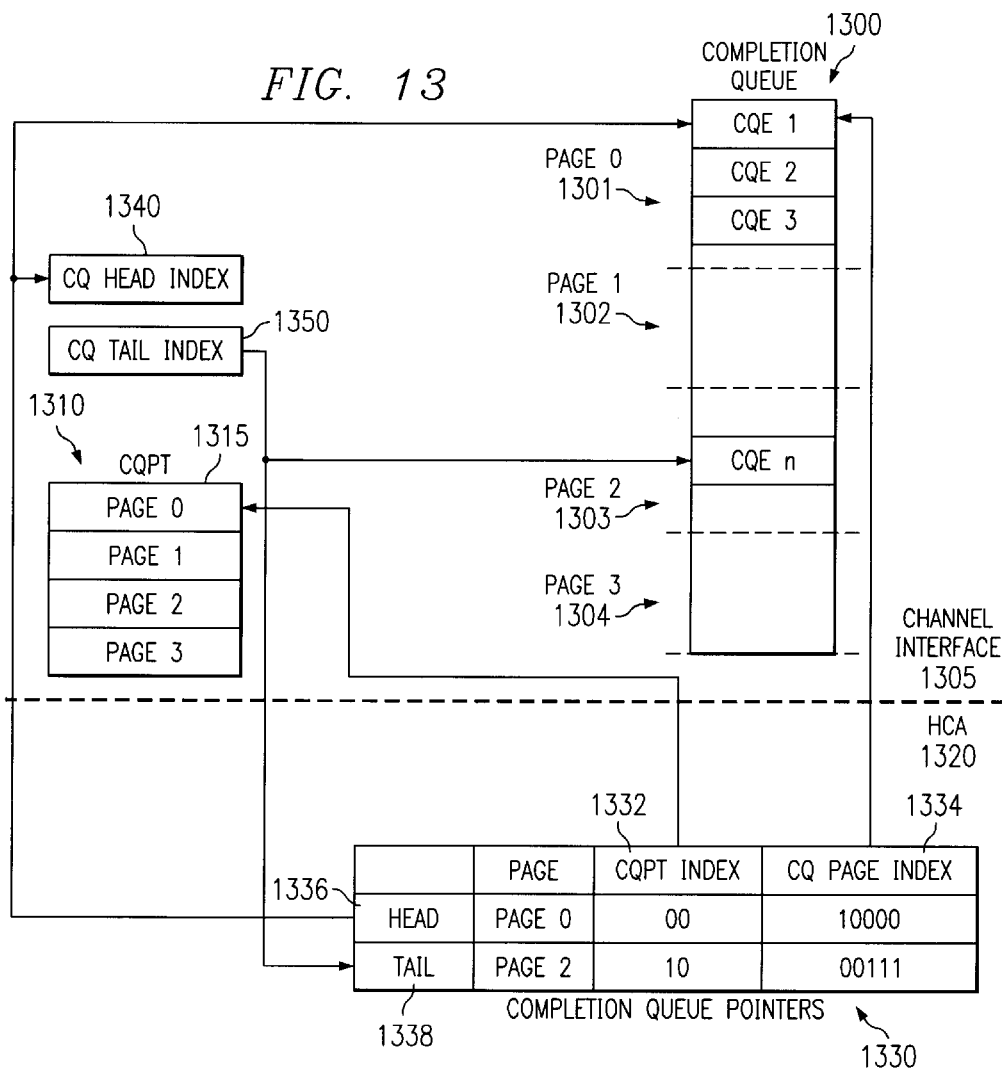
FIG. 13 is an exemplary block diagram of a completion queue in accordance with the present invention.

FIG. 13 shows an example completion queue in accordance with one embodiment of the present invention. The completion queue (CQ) 1300 shown in FIG. 13 is made up of one or more pages 1301–1304, which are typically 4 Kbytes in size, although other sizes may be used. In the depicted example, completion queue 1300 uses four pages 1301–1304 located in system memory of the channel interface 1305.

The completion queue entry (CQE) size, in this exemplary embodiment, is chosen such that the number of CQEs that fit within a page is a power of two. The reason for this is the same as set forth above, i.e. that the hardware is simplified by making this number of pages a power of two, while still maintaining significant flexibility in the choice of size of completion queue.

For example, with a 64 byte CQE, 64 CQEs would fit in a 4K page. In this exemplary embodiment, such a CQE size provides a queue depth of 256 CQEs. Different queue depths can be provided by changing the number of pages that make up the completion queue 1300. Other CQE sizes may be chosen without departing from the spirit and scope of the present invention with less simplified hardware being a result.

A Completion Queue Page Table (CQPT) 1310 is maintained in memory, such as system memory or HCA memory, that contains a list 1315 of pages that make up the completion queue 1300. Whether the CQPT 1310 is located in system memory or host channel adapter (HCA) memory, in either case the CQPT location is stored in the HCA 1320.

The HCA 1320 stores pointers 1330 to the CQPT 1310 and the pages of the CQ 1300. The HCA 1320 maintains two indices for each completion queue 1300. The first, the CQPT index 1332, is used to index into the aforementioned CQPT 1310. In the depicted example, the CQPT index 1332 is two bits, although other sizes for the CQPT index 1332 may be used without departing from the spirit and scope of the present invention.

The second index is the CQ Page Index 1334, which is used to index into each page 1301–1304 of the completion queue. For example, with a 64 byte CQE and a 4K page, the CQ Page Index 1334 would be 6 bits. Other sizes for the CQ Page Index 1334 may be used without departing from the spirit and scope of the present invention.

The CQ 1300 further has associated with it a CQ head index 1340 and a CQ tail index 1350. As will be explained in greater detail hereafter, the CQ head index 1340 is used by the channel interface 1305 to manage the processing of CQEs in the CQ 1300 and the CQ tail index 1350 is used by the channel interface 1305 to determine if the CQ 1300 is empty.

The HCA maintains its own version of the CQ head index 1336 and CQ tail index 1338. These CQ indices are comprised of the CQPT Index 1332 and the CQ Page Index 1334 for the CQ head index 1336 and CQ tail index 1338, respectively. As will be described in greater detail hereafter, the HCA 1320 uses the CQ head index 1338 to identify whether the completion queue is full, and uses the CQ tail index 1336 to determine the next position to which the HCA 1320 may post a CQE.

The initial state of the CQ 1300 is empty whereby the CQ head and tail indices 1340 and 1350 are equal and reference the top of the CQ 1300. The CQ head index 1340 points to the position within the CQ 1300 of the next CQE to be processed by the channel interface 1305. The CQ tail index 1338 in the HCA 1320 points to the position within the CQ 1300 where the next CQE may be written to by the HCA 1320.

As CQEs are written to the CQ 1300, the position of the CQ tail index 1338 moves through the CQ 1300. Similarly, as CQEs are processed, the CQ head index 1340 moves through the CQ 1300. As a result, the CQPT index 1332 and CQ page index 1334 for the CQ tail index 1338 changes due to the moving of the CQ tail index 1338 through the CQ 1300.

The CQ head index 1340 is periodically used to update the CQ head index 1336 and thus, the CQPT index 1332 and CQ page index 1334 for the CQ head index 1336 in the HCA 1320. The updated CQ head index 1336 may then be used by the HCA 1320 to determine if the CQ 1300 is full and whether CQEs may be written to the CQ 1300.

Similarly, the CQ tail index 1338 is periodically used to update the CQ tail index 1350. The CQ tail index 1350 may then be used by the channel interface 1305 to determine if the CQ 1300 is empty or whether there are CQEs that may be processed.

Thus, the HCA 1320 is mainly concerned with the CQPT index 1332 and the CQ page index 1334 of the CQ tail index 1338 in determining where a next CQE may be written to in the CQ 1300. The CQ head index 1336 is only used by the HCA 1320 to determine if the CQ 1300 is full and thus, CQEs may not be written to the CQ 1300.

The channel interface 1305, however, is primarily concerned with the CQ head index 1340 which is used to determine the next CQE in the CQ 1300 for processing. The channel interface 1305 uses the CQ tail index 1350 only to determine whether the CQ 1200 is empty and thus, there are no CQEs for processing.

Detailed Work Request Operation

Referring again to FIG. 12, when a consumer posts a work request to a work queue, such as work queue 1200, the channel interface 1205, or CI, builds a WQE that defines the request and writes this WQE at the position of the tail of the work queue 1200. The location of the tail is determined from the WQ tail index 1250.

The combination of the page address and the offset into the page provides the address at which the WQE is placed. Alternatively, if the work queue pages correspond to a contiguous virtual address space, the CI may maintain a WQ tail pointer that is a virtual address, and use hardware address translation to store the WQE at the appropriate location in the work queue.

Prior to posting the WQE, the channel interface 1205 performs a comparison between the WQ head index 1240 and the WQ tail index 1250 incremented by one. If they are equal, the work queue is full. As a result, the work request is not accepted until the HCA 1220 indicates that one or more WQEs have been processed by posting one or more CQEs to the completion queue 1300.

If the work queue 1200 is not full, the WQE is written to the location referenced by the WQ tail index 1250, prior to incrementing. The WQ tail index 1250 is then incremented so that it references the location at which the next WQE will be placed. The updated WQ tail index 1250 is written to the HCA's tail index 1238 (WQPT index 1232 plus WQ page index 1234), to inform the HCA 1220 that there is one or more WQEs on the work queue 1200 that needs processing.

When the WQ tail index 1250 is incremented, if the page index wraps, the WQPT index 1232 is incremented by one. If the WQPT index 1232 wraps, the work queue 1200 has wrapped to the top of the work queue 1200.

While the CI 1205 is in the process of checking and updating the WQ tail index 1250 and writing the WQE to the tail of the work queue 1200, the CI needs to obtain an exclusive lock of these resources to prevent them from being used by other processes. An exclusive lock may be obtained in any known manner.

The HCA 1220 may monitor the work queue 1200, by comparing the WQ head and tail indices 1236 and 1238. If equal, the work queue 1200 is empty. If not equal, there is a WQE to be processed, and the HCA 1220 will transmit the message requested. Alternatively, when the CI updates the WQ tail index 1250 and stores it in the HCA 1220, the HCA 1220 may use this update as an indication that there is a WQE to be processed.

When there is a WQE to process, the HCA 1220 determines the location of the WQE by first locating the page that contains the WQE. This is done by indexing into the WQPT 1210 using the WQPT index 1232 of the WQ head index 1236. The location within the page is then determined based on the WQ page index 1234 and the size of the WQE.

After the message has been successfully transmitted, and any acknowledgments that may be required have been received, the WQE processing is completed. The HCA 1220 increments its own copy of the WQ head index 1236. When the WQ head index 1236 is incremented, if the page index wraps, the WQPT index 1232 is incremented by one. If the WQPT index 1232 wraps, the work queue 1200 has wrapped to the top of the work queue 1200.

After the WQE processing has completed, the HCA 1220 notifies the CI 1205 by writing a CQE to the tail of the CQ 1300, identified using the CQ tail index 1338. Prior to writing the CQE, the HCA first checks that the CQ 1300 is not full by comparing the CQ head index 1336 with the CQ tail index 1338 incremented by one. If the CQ head index 1336 is equal to the incremented CQ tail index 1338, the CQ 1300 is full, and the operation is terminated in error. If the CQ 1300 is not full, the HCA 1320 determines the location at which to store the CQE by first locating the page using the CQPT index 1332 in the CQ tail index 1338 (prior to the increment).

The location within the page is then determined based on the CQ page index 1334 and the size of the CQE. After incrementing, if the page index wraps, the CQPT index 1332 is incremented by one. If the CQPT index 1332 wraps, the CQ tail index 1338 has wrapped to the top of the completion queue 1300.

After storing the CQE the CI is informed that a new CQE has been placed on the CQ 1300 by the HCA 1320 storing the incremented CQ tail index 1338 to the CI's tail index 1350 in system memory. When the CI detects that the CQ 1300 is not empty (the CQ head and tail indices 1340 and 1350 are not equal) and a consumer has requested work completion information, the CI reads the CQE at the head of the CQ 1300. This CQE is referenced by the CQ head index 1340 in combination with the CQ page table 1310. Alternatively, if the CQ pages correspond to a contiguous virtual address space, the CI may maintain a CQ head pointer 1340 that is a virtual address, and use hardware address translation to fetch the CQE from the appropriate location on the CQ 1300. The contents of the CQE are then used to return the work completion information to the consumer that requested it.

After the CQE has been processed by the CI, the CQ head index 1340 is incremented in a similar manner to the way in which the CI increments the WQ tail index 1250. The updated CQ head index 1340 is stored in the HCA 1320 for future checks by the HCA 1320 to see if the CQ 1300 is full. In addition, the CI may now reclaim the WQE corresponding to this CQE by incrementing its copy of the WQ head index 1240 that is used to check if the work queue 1200 is full. The CI is required to perform this update of the head index to guarantee that there is a corresponding space on the CQ 1300 prior to freeing up the space on the work queue 1200.

While the CI is in the process of checking and updating the CQ head index 1340 and reading the CQE from the head of the completion queue 1300, the CI needs to obtain an exclusive lock of these resources to prevent them from being used by other processes. This exclusive lock may be obtained in a similar manner as previously described with reference to the work queue 1200.

Figure 14:
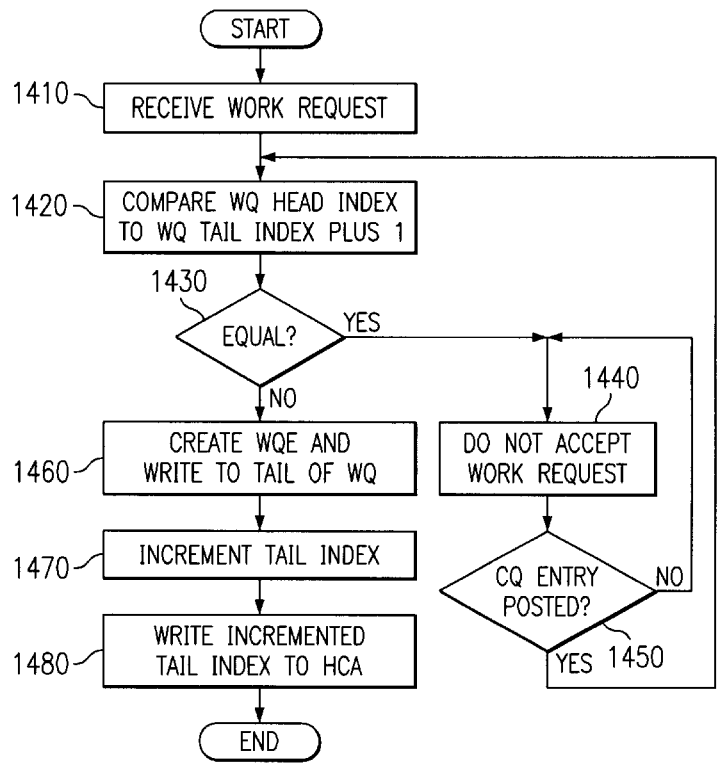
FIG. 14 is a flowchart outlining an exemplary operation of the present invention when processing a work request.

FIG. 14 is a flowchart outlining an exemplary operation of the present invention when storing work queue entries. As shown in FIG. 14, the operation starts with receipt of a work request (step 1410). A comparison is made of the work queue head index and the work queue tail index plus 1 (step 1420). If the two quantities are equal (step 1430), the work request is not accepted (step 1440) until a completion queue entry has been posted (step 1450).

If the two quantities in step 1420 are not equal (step 1430), a work queue entry is created and written to the tail of the work queue (step 1460). The work queue tail index is then incremented (step 1470) and written to the host channel adapter (step 1480). The operation then ends.

Figure 15:
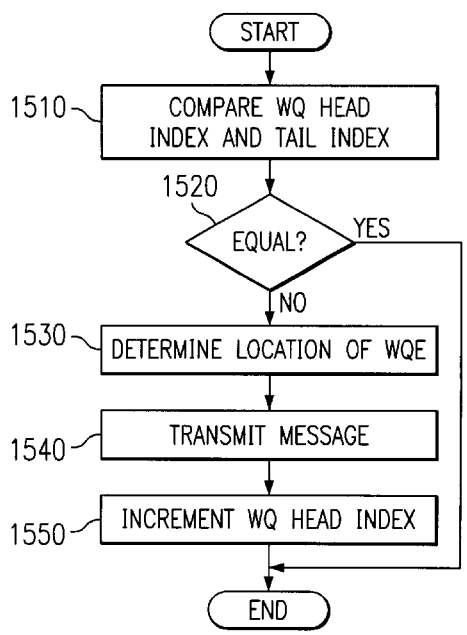
FIG. 15 is a flowchart outlining an exemplary operation of the present invention when processing a work queue entry.

FIG. 15 is a flowchart outlining an exemplary operation of the present invention when processing a work queue entry. As shown in FIG. 15, the operation starts with a comparison of the work queue head index to the work queue tail index (step 1510). If the two quantities are equal (step 1520), the operation ends because the work queue is empty. If the two quantities are not equal, the location of the work queue entry is determined (step 1530) and the corresponding message is transmitted (step 1540). The work queue head index is then incremented (step 1550) and the operation ends.

FIG. 16 is a flowchart outlining an exemplary operation of the present invention when storing a completion queue entry. As shown in FIG. 16, the operation starts with a comparison of the completion queue head index to the completion queue tail index plus 1 (step 1610). If the two quantities are equal (step 1620), the operation terminates with an error (step 1630). If the two quantities are not equal, the location for storing the CQE based on the CQ tail index is determined (step 1640). The CQE is then stored at this location (step 1650) and the CI is informed of the new CQE (step 1660). The operation then ends.

FIG. 17 is a flowchart outlining an exemplary operation of the present invention when handling a work completion information request. As shown in FIG. 17, the operation starts with receipt of a work completion information request (step 1710). The completion queue head index is compared to the completion queue tail index (step 1720). If the two are equal (step 1730), the CQ is empty. If the two are not equal, the completion queue entry at the completion queue head position is read (step 1740) and processed (step 1750). The completion queue head index is then incremented (step 1760) and stored in the HCA (step 1770). The operation then ends.

Thus, the present invention provides an apparatus and method by which work and completion queues in a SAN may be managed using head and tail pointers. The present invention allows management of queues to be performed primarily in the host channel adapter and channel interface hardware and thus, the performance of the system is improved.

Optimizations

Following is a list of optimizations to the basic methodology described earlier in this disclosure:

1) The CI may reduce the number of writes, i.e. updates of the head and tail indices, to the HCA by updating the work queue tail index only once after several WQEs have been placed on the work queue. For example, in FIG. 14, to reduce the number of writes to the HCA, step 1480 is not performed every time a work queue entry is written to the work queue. Rather, a decision block may be added before step 1480 such that step 1480 is only performed after n WQEs have been posted. The variable n may be configurable, may be dynamically set, may be based on time rather than number of work queue entries posted, and the like.

2) The CI may reduce the number of writes to the HCA, i.e. updates of the head and tail indices, by updating the CQ head index only once after several CQEs have been retrieved from the CQ. This optimization is similar to optimization 1 above. For example, in FIG. 17, step 1760 may not be performed every time a CQE is processed. A decision block may be added before step 1760 such that step 1760 is only performed after n CQEs have been processed. Again, the variable n may be configurable, may be dynamically set, may be based on time rather than number of completion queue entries processed, and the like.

3) The HCA may reduce the number of writes to system memory by updating the CQ tail index only once after placing several CQEs on the CQ. For example, in FIG. 16, step 1660 may not be performed every time a CQE is written. Rather, a decision block may be added before step 1660 such that step 1660 is only performed after n CQEs have been written. As with optimizations 1 and 2 above, n may be configurable, dynamically set, based on time, and the like.

4) If the work queue or CQ are contiguous in a virtual address space, the CI may reference that queue using the virtual address and using the hardware address translation mechanisms to perform the store or fetch. In this case the virtual address used to reference the queue may be incremented by the length of the WQE or CQE after the access. A check may be made against the virtual address of the end of the queue to detect when a wrap had occurred. In this case the CI does not need to maintain indexes and page pointers to determine the location of the WQE or CQE. Rather, the CI can use existing hardware capabilities.

5) For work queues that fit within a single page, which may occur when the queue is small or the page size is large, the WQPT 1210 and the WQPT index 1232 may be eliminated. The real address of the single page would still need to be stored.

6) For CQs that fit within a single page, which may occur when the queue is small or the page size is large, the CQPT 1310 and the CQPT index 1332 may be eliminated. The real address of the single page would still need to be stored.

7) If the work queue is located in contiguous real memory, that is accessible by both the CI and the HCA, the WQPT 1210 and the WQPT index 1232 may be eliminated. This is equivalent to a single large page described in optimization 6 above.

8) If the CQ is located in contiguous real memory, that is accessible by both the CI and the HCA, the CQPT 1310 and the CQPT index 1332 may be eliminated. This is equivalent to a single large page as described in optimization 7 above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing a queue, comprising:
   generating a first queue head index for the queue in a channel interface;
   generating a first queue tail index in the channel interface;
   generating a second queue head index for the queue in a host channel adapter;
   generating a second queue tail index for the queue in the host channel adapter; and
   controlling the queue using the first and second head and tail indices.

2. The method of claim 1, wherein the queue is a work queue, and wherein the first queue head index is used to determine if the work queue is full.

3. The method of claim 1, wherein the queue is a work queue, and wherein the first queue tail index is used to determine a position in the work queue where a work queue entry may be written by the channel interface.

4. The method of claim 1, wherein the queue is a work queue, and wherein the second queue head index is used to determine a work queue entry to be processed by the host channel adapter.

5. The method of claim 1, wherein the queue is a work queue, and wherein the second queue tail index is used to determine if the work queue is empty.

6. The method of claim 1, wherein the queue is a completion queue, and wherein the first queue head index is used to identify a completion queue entry to be processed by the channel interface.

7. The method of claim 1, wherein the queue is a completion queue, and wherein the first queue tail index is used to determine if the completion queue is empty.

8. The method of claim 1, wherein the queue is a completion queue, and wherein the second queue head index is used to determine if the completion queue is full.

9. The method of claim 1, wherein the queue is a completion queue, and wherein the second queue tail index is used to identify a position in the completion queue where a completion queue entry may be written.

10. The method of claim 1, wherein the second queue head index and the second queue tail index are comprised of a queue pointer table index and a queue page index.

11. The method of claim 1, wherein the queue is a work queue, and wherein controlling the queue includes:
    performing a comparison of the first queue head index and the first queue tail index incremented by 1; and
    accepting a work request if the first queue head index and the first queue tail index incremented by 1 are not equal.

12. The method of claim 11, wherein accepting the work request includes:
    writing a work queue entry corresponding to the work request in a position of the work queue identified by the first queue tail pointer;
    incrementing the first queue tail pointer; and
    updating the second queue tail pointer based on the incremented first queue tail pointer.

13. The method of claim 12, wherein updating the second queue tail pointer is not performed for every increment of the first queue tail pointer.

14. The method of claim 1, wherein the queue is a work queue, and wherein controlling the queue includes:
    comparing the second queue head index and the second queue tail index;
    processing, in the host channel adapter, a work queue entry corresponding to the second queue head index if the second queue head index is not equal to the second queue tail index; and
    posting a completion queue entry to a completion queue after processing of the work queue entry is complete.

15. The method of claim 1, wherein the queue is a completion queue, and wherein controlling the queue includes:
    comparing the second queue head index to the second queue tail index incremented by 1; and
    writing a completion queue entry to a position of the completion queue identified by the second queue tail if the second queue head index is not equal to the second queue tail index incremented by 1.

16. The method of claim 1, wherein the queue is a completion queue, and wherein controlling the queue includes:
    comparing the first queue head index to the first queue tail index; and
    processing a completion queue entry identified by the first queue head index if the first queue head index is not equal to the first queue tail index.

17. A computer program product in a computer readable medium for managing a queue, comprising:
    first instructions for generating a first queue head index for the queue in a channel interface;
    second instructions for generating a first queue tail index in the channel interface;
    third instructions for generating a second queue head index for the queue in a host channel adapter;
    fourth instructions for generating a second queue tail index for the queue in the host channel adapter; and
    fifth instructions for controlling the queue using the first and second head and tail indices.

18. The computer program product of claim 17, wherein the queue is a work queue, and wherein the first queue head index is used to determine if the work queue is full.

19. The computer program product of claim 17, wherein the queue is a work queue, and wherein the first queue tail index is used to determine a position in the work queue where a work queue entry may be written by the channel interface.

20. The computer program product of claim 17, wherein the queue is a work queue, and wherein the second queue head index is used to determine a work queue entry to be processed by the host channel adapter.

21. The computer program product of claim 17, wherein the queue is a work queue, and wherein the second queue tail index is used to determine if the work queue is empty.

22. The computer program product of claim 17, wherein the queue is a completion queue, and wherein the first queue head index is used to identify a completion queue entry to be processed by the channel interface.

23. The computer program product of claim 17, wherein the queue is a completion queue, and wherein the first queue tail index is used to determine if the completion queue is empty.

24. The computer program product of claim 17, wherein the queue is a completion queue, and wherein the second queue head index is used to determine if the completion queue is full.

25. The computer program product of claim 17, wherein the queue is a completion queue, and wherein the second queue tail index is used to identify a position in the completion queue where a completion queue entry may be written.

26. The computer program product of claim 17, wherein the queue is a work queue, and wherein controlling the queue includes:
    performing a comparison of the first queue head index and the first queue tail index incremented by 1; and
    accepting a work request if the first queue head index and the first queue tail index incremented by 1 are not equal.

27. The computer program product of claim 17, wherein the queue is a work queue, and wherein controlling the queue includes:
    comparing the second queue head index and the second queue tail index;
    processing, in the host channel adapter, a work queue entry corresponding to the second queue head index if the second queue head index is not equal to the second queue tail index; and
    posting a completion queue entry to a completion queue after processing of the work queue entry is complete.

28. The computer program product of claim 17, wherein the queue is a completion queue, and wherein controlling the queue includes:
    comparing the second queue head index to the second queue tail index incremented by 1; and
    writing a completion queue entry to a position of the completion queue identified by the second queue tail if the second queue head index is not equal to the second queue tail index incremented by 1.

29. The computer program product of claim 17, wherein the queue is a completion queue, and wherein controlling the queue includes:

comparing the first queue head index to the first queue tail index; and processing a completion queue entry identified by the first queue head index if the first queue head index is not equal to the first queue tail index.

30. An apparatus for managing a queue, comprising:

a channel interface; and a host channel adapter coupled to the channel interface, wherein the channel interface includes a first queue head index for the queue and a first queue tail index for the queue, the host channel adapter includes a second queue head index for the queue and a second queue tail index for the queue, and wherein the host channel adapter and channel interface manage the queue using the first and second head and tail indices.

* * * * *